(12) United States Patent
Seman, Sr. et al.

(10) Patent No.: US 8,343,407 B1
(45) Date of Patent: Jan. 1, 2013

(54) PROCESS FOR OVERMOLDING A RIGID CURVED PROFILE

(75) Inventors: Richard F. Seman, Sr., Middlefield, OH (US); William Shane Hochstetler, Warren, OH (US)

(73) Assignees: Mercury Plastics, Inc., Middlefield, OH (US); Masco Corporation, Taylor, MI (US)

( * ) Notice: Subject to any disclaimer, the term of this patent is extended or adjusted under 35 U.S.C. 154(b) by 331 days.

(21) Appl. No.: 12/618,158

(22) Filed: Nov. 13, 2009

(51) Int. Cl.
*B29C 45/14* (2006.01)

(52) U.S. Cl. .......................... 264/275; 264/334

(58) Field of Classification Search .................. None
See application file for complete search history.

(56) References Cited

U.S. PATENT DOCUMENTS

| | | | |
|---|---|---|---|
| 3,028,630 A | 4/1962 | Walker | |
| 3,632,277 A | 1/1972 | Stalter | |
| 3,711,590 A * | 1/1973 | Deutsch | 264/318 |
| 3,930,777 A * | 1/1976 | Ramsey | 425/190 |
| 4,050,667 A * | 9/1977 | Kossett | 249/82 |
| 5,622,670 A | 4/1997 | Rowley | |
| 5,895,695 A | 4/1999 | Rowley | |
| 5,965,077 A * | 10/1999 | Rowley et al. | 264/263 |
| 6,287,501 B1 * | 9/2001 | Rowley | 264/254 |
| 6,426,031 B1 * | 7/2002 | Hayes, Jr. | 264/318 |
| 6,485,666 B1 | 11/2002 | Rowley | |
| 6,838,041 B2 | 1/2005 | Rowley | |

FOREIGN PATENT DOCUMENTS

| | | | |
|---|---|---|---|
| JP | 51070258 | * | 6/1976 |
| JP | 2008-56301 | * | 3/2008 |

OTHER PUBLICATIONS

U.S. Appl. No. 12/618,332, filed Nov. 13, 2009.
U.S. Appl. No. 12/618,089, filed Nov. 13, 2009.
U.S. Appl. No. 12/618,226, filed Nov. 13, 2009.
U.S. Appl. No. 12/618,296, filed Nov. 13, 2009.

* cited by examiner

*Primary Examiner* — Edmund H. Lee
(74) *Attorney, Agent, or Firm* — Hahn Loeser + Parks, LLP

(57) ABSTRACT

The present invention pertains to an overmolding process and apparatus for overmolding nonlinear profiles from rigid or semi-rigid polymeric material. Rigid polymeric materials are melted and overmolded onto an extruded profile, which is received by a mold having a mold cavity and core pin. The mold cavity and core pin have a radial angle of curvature ($R_c$). In the overmolding process, rigid polymeric material is injected around the core pin and cavity, and the overmolded article is removed from the mold. The core pin is removed from the overmolded article to form a non-linear overmolded article according to the present process and arrangement of parts.

9 Claims, 3 Drawing Sheets

US 8,343,407 B1

PROCESS FOR OVERMOLDING A RIGID CURVED PROFILE

TECHNICAL FIELD

The present invention pertains to a process for overmolding rigid or substantially rigid and/or semi-rigid curved polymeric profiles onto substantially linear profiles using a curved core pin with a radius of curvature ($R_c$) and an injection overmolding apparatus to accomplish the same.

BACKGROUND OF THE INVENTION

Conduits, such as copper tubing are well known in plumbing applications where the tubing is used for channeling liquids from a first location to a second location. Copper conduit is assembled from various sections of curved as well as straight pieces of tubing. The pieces of tubing, also referred to as profiles, particularly when the pieces are non-circular in cross-section, are cut to length and soldered together with fittings, e.g., elbows, shutoff valves, and/or tees, in a desired configuration. However, the assembly process is labor intensive. Moreover, the cost of copper is substantial and in recent times has dramatically increased. Additionally, the welding process typically requires more welding knowledge than the average do-it-yourself plumber possesses.

To compensate, at least in part, for the rise in production costs, producers of plumbing supplies have turned to forming conduit from polymeric materials. In particular, polyvinyl chloride ("PVC") and polyethylene ("PE") are commonly used to construct plumbing conduit, as well as fittings and valves. Polymeric materials are often connected by using adhesives to connect the joints together. The adhesive is considerably easier to apply than solder, which may simplify the profile assembly process.

In certain applications, the plumbing conduit must follow a circuitous path, for example, through walls in a structure or around components in a machine or appliance. When profiles are connected using adhesives, leaks may occur at the joints. The increase in connections between sections of tubing may lead to an increased potential for leaks within the system. Solutions intent on obviating these problems focus on forming conduits as a unitary article by injection overmolding.

Injection overmolding of thermoplastics is a process by which plastic is melted and injected into a mold cavity void. Once the melted plastic is in the mold void volume, it cools to a shape that reflects the geometry of the void. When polymers are heated in an injection molding operation, they soften and as pressure is applied, flow through the runners in the mold into the mold cavity or cavities. The mold has cavities that, when filled with the polymeric material, define the overmolded part. During the overmolding process a core pin is inserted into the cavity to form a channel through the overmolded part. As the polymeric material cools, the material hardens. When cooled enough, the mold is opened and the overmolded part is removed.

Conventional core pins are used in plastic injection overmolding processes when channels are desired in the overmolded part. In order to accomplish this function the core pin projects into the cavity and prevents the plastic from filling the area occupied by the core pin. If a channel is desired completely through the overmolded part the core pin must seat tightly against the opposing face of the mold or project into an inserted profile. The core pin is the accepted means of accomplishing this task. However, inasmuch as the core pin is typically a fixed length of a generally straight configuration when mounted in the mold there are certain limitations, particularly when it is used to form a channel completely through a rigid curved overmolded part.

During a linear overmolding process, melted polymer material flows into and around the other preformed element(s) (e.g., a core pin or insert, which may be a polymer which is able to withstand elevated temperatures within the mold without significant deformation, or more typically will be metallic in composition, and/or inserted polymer tube(s)). A straight core pin is easily inserted into the mold cavity and easily removed from any polymer overmolded part.

In a non-linear, i.e., curved overmolding operation, when the overmolded polymeric material is flexible, the core pin may be removed from the overmolded section of the part by simply moving the core pin out of axial alignment with the overmold and the flexibility of the overmold accommodates removal of the core pin.

In the current state of the art, for rigid or semi-rigid polymers, the application of overmolding is limited primarily to linear profiles. Thus, to assemble a non-linear conduit made from a rigid polymer, traditional adhesives are used to connect linear and non-linear sections of tubing. There exists a need for an overmolding process to form non-linear overmolded sections having a radius of curvature ($R_c$) from substantially rigid polymers.

In this invention, the problem of overmolding non-linear sections of rigid or semi-rigid polymers is solved by incorporating a core pin having a radius of curvature corresponding to the desired overmold final configuration so that a non-linear overmold may be constructed without the use of adhesives. The result is an overmold having a hollow interior channel corresponding to the radius of the curvature of the core pin.

SUMMARY OF THE INVENTION

In the embodiments of the present invention, a conduit having at least one curved end section is formed from rigid polymeric material in an overmolding process. A substantially rigid polymeric material is overmolded onto a curved core pin within a mold cavity, the curved core pin having a radius of curvature ($R_c$). The molten material is injected into the mold, cooled and curved core pin removed by ejection of the curved pin along the radius of curvature. The heat from the molten material melts a portion of the inserted profile, and the at least partially chemically compatible polymers bond together to effectuate a leak-proof arrangement of parts.

In another embodiment of the present invention, a process for overmolding a curved rigid or semi-rigid polymer first profile onto a second pre-formed profile (preferably an extruded polymer profile of almost any degree of rigidity—ranging from flexible to rigid) comprises the steps of assembling a split mold having at least one channel and a mold cavity, said channel in communication with said cavity; inserting said second pre-formed profile into said at least one channel and at least partially into the cavity; inserting a curved core pin into the mold cavity and at least partially into said second pre-formed profile; injecting a polymeric material into the split mold and the mold cavity thereby overmolding onto at least a portion of the pre-formed profile to form an overmolded profile; removing the core pin and the two profiles from the split mold; and extracting the core pin from the first profile along a radius of curvature of the core pin and said first profile.

In a further embodiment, an injection overmolding system is described for overmolding a curved rigid or substantially rigid polymer profile onto a second pre-formed profile (preferably an extruded polymer profile) which comprises a split mold having at least one channel; a mold cavity situated within the mold and in communication with the at least one channel; and a core pin insertable into the mold cavity, wherein at least a portion of the core pin has a radius of curvature.

In another embodiment, a process for overmolding is described for forming a curvilinear rigid or semi-rigid polymer having a first profile, a radial angle of curvature ($R_c$), a radial angle of curvature radius (R), and a circumferential radial segment ($R_s$) onto a second pre-formed profile, said second pre-formed profile having an internal radius ($R_p$) comprising the steps of: assembling a split mold having at least one channel and a mold cavity, said channel in communication with said cavity; inserting said second pre-formed profile into said at least one channel and at least partially into the cavity; inserting a curved core pin into the mold cavity and at least partially into said second pre-formed profile; injecting a polymeric material into the split mold and said mold cavity thereby overmolding onto at least a portion of the pre-formed profile to form an overmolded profile having a durometer ranging from approximately 35 Shore D to 95 Shore D inclusive; removing said core pin and the two profiles from the split mold; extracting said core pin from the first profile along said radial angle of curvature of said core pin and said first profile; wherein said radial angle of curvature ($R_c$) of said core pin and said mold cavity are essentially the same and said radial angle of curvature ranges between approximately 20° to 360° inclusive; said radial angle of curvature further being in the shape of a helix, said helix having a pitch equal to the width of one complete helix turn as measured along the helix axis and equal to at least 2*R; said radial segment ($R_s$) is defined by the formula $$R_s = \frac{R_c * 2 * \pi * R}{360°}$$

wherein R is greater than or equal to twice $R_p$; and further wherein as said durometer of said overmolded profile increases from 35 Shore D to 95 Shore D, said radial segment ($R_s$) decreases.

In yet another embodiment, a process for overmolding is described for forming a curvilinear rigid or semi-rigid polymer having a first profile, a radial angle of curvature ($R_c$), a radial angle of curvature radius (R), and a circumferential radial segment ($R_s$) onto a second pre-formed profile, said second pre-formed profile having an internal radius ($R_p$) comprising the steps of: assembling a split mold having at least one channel and a mold cavity, said channel in communication with said cavity; inserting said second pre-formed profile into said at least one channel and at least partially into the cavity; inserting a curved core pin into the mold cavity and at least partially into said second pre-formed profile; injecting a polymeric material into the split mold and said mold cavity thereby overmolding onto at least a portion of the pre-formed profile to form an overmolded profile having a durometer ranging from approximately 35 Shore D to 95 Shore D inclusive; removing said core pin and the two profiles from the split mold; extracting said core pin from the first profile along said radial angle of curvature of said core pin and said first profile; wherein said radial angle of curvature ($R_c$) of said core pin and said mold cavity are essentially the same and said radial angle of curvature ranges between approximately 20° to 150° inclusive; said radial segment ($R_s$) is defined by the formula $$R_s = \frac{R_c * 2 * \pi * R}{360°}$$

wherein R is greater than or equal to twice $R_p$; and further wherein as said durometer of said overmolded profile increases from 35 Shore D to 95 Shore D, said radial segment ($R_s$) decreases.

In one mode of the invention, the radial angle of curvature ($R_c$) is between approximately 30° to 120° inclusive, the durometer of said overmolded profile ranges from approximately 40 Shore D to 65 Shore D inclusive, and wherein R is greater than or equal to four times $R_p$.

In another mode of the invention, the radial angle of curvature ($R_c$) is between approximately 40° to 90° inclusive, the durometer of said overmolded profile ranges from approximately 45 Shore D to 60 Shore D inclusive, and wherein R is greater than or equal to 10 times $R_p$. The second preformed profile is preferably extruded.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE DRAWINGS

Figure 1:
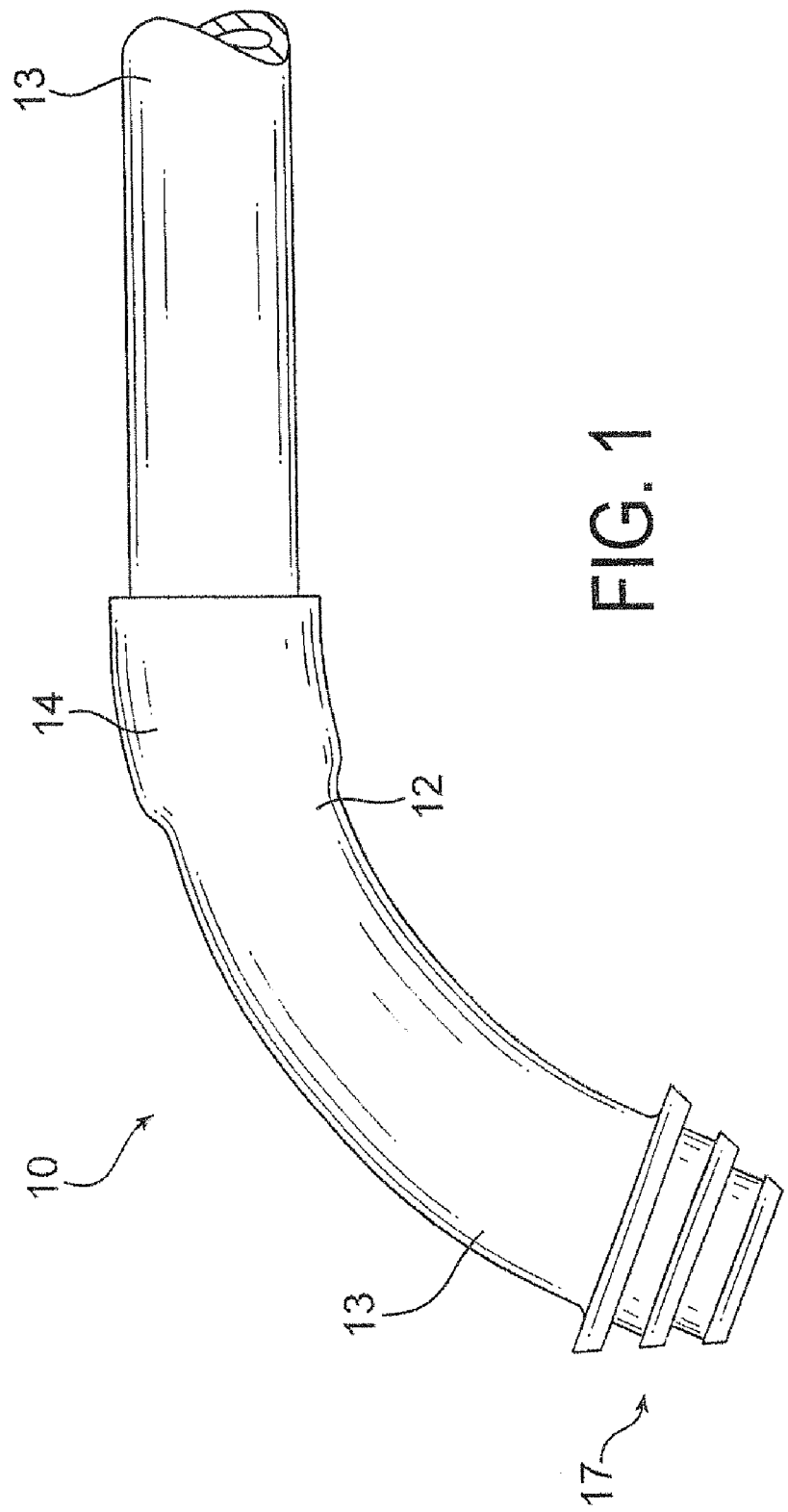
FIG. 1 is a perspective view of a curved rigid and/or semi-rigid overmold end section on a tube according to the embodiments of the subject invention.

Referring now to the drawings wherein the showings are for purposes of illustrating embodiments of the invention only and not for purposes of limiting the same, the Figures show a conduit 10 having at least one rigid and/or semi-rigid curved overmolded end and an overmolding process for forming the conduit. Conduit 10 may be used in a plumbing application to convey fluid within a system, which may be a pressurized supply line or non-pressurized drain. Alternatively, conduit 10 may be used in an air tunnel conveying mist or vapor in an appliance or used as a conduit to protect electrical wire. However, any application of conduit 10 may be chosen without departing from the intended scope of coverage of the embodiments of the subject invention. For illustrative purposes only, conduit 10 will be described in the context of a system used for conveying pressurized fluid, which may include water-based liquids. Conduit 10 has an interior and exterior profile and may be fashioned from various components, each having their own unique profile. In one particular embodiment, conduit 10 is formed as a unitary article from the combination of an initial profile and an overmolded profile in a molding process to be described in detail below. End 17 of conduit 10 may be particularly configured as is desired for a particular application and may be any number of shapes and geometries, all determined by the internal void geometry of the split mold. For example, conduit 10 may include sealing surfaces of various geometrics (e.g., radiused, cone-shaped, cup-shaped, etc.), risers, flanges, o-ring grooves, threaded ends and/or any suitable configuration for connection with other components. In some arrangements, conduit 10 may form a sub-section of the overall system. Still, in other embodiments, conduit 10 formed according to the process described herein may comprise the entire fluid channel of the system.

Referring to FIG. 1, an assembly 12 is overmolded through the injection overmolding process, which include curved as well as straight sections of overmolded tubing that make up the arrangement of curved conduit 10. As used in this application, the terms "profile," "tube," "tubular," and "tubing" is meant to encompass all conduit profiles in cross-section, whether the conduit is used for gaseous transport or liquid transport.

Also, as used in this application, the term "chemically compatible" means that the composition of the overmolded polymer and underlying profile will be such that the two polymers are capable of at least some melt fusion, thereby maximizing the leak-proof characteristics of the interface between the plastic conduit profile and overmolded plastic. There are several means by which this may be achieved. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit profile and the interior region of the overmolded polymer. Another manner in which to state this would be to indicate that at least a portion of the polymer compositions of the plastic conduit and the overmolded polymer are miscible.

The inventive process as currently disclosed is important in forming a conduit having an overmolded segment or component with rigid or semi-rigid characteristics, the overmolded portion having a radius of curvature (R).

"Rigid" as used in this invention is defined as polymeric material having a durometer in the range of approximately 55 Shore D to 95 Shore D inclusive, more preferably between 60 Shore D to 95 Shore D inclusive, most preferably 65 Shore D to 95 Shore D inclusive.

"Semi-rigid" as used in this invention is defined as polymeric material having a durometer in the range of approximately 35 Shore D to 55 Shore D inclusive, more preferably between 40 Shore D to 55 Shore D inclusive, most preferably between 45 Shore D to 55 Shore D inclusive.

"Flexible" or "elastomeric" as used in this invention is defined as polymeric material having a durometer in the range of approximately 5 Shore A to 95 Shore A inclusive, more preferably between 10 Shore A to 90 Shore A inclusive, most preferably between 15 Shore A to 85 Shore A inclusive.

"Radial angle of curvature ($R_c$)" as used in this invention is defined as an angle in the range of approximately between 20° to 360° inclusive, more preferably between 20° to 150° inclusive, more preferably between 30° to 120° inclusive, most preferably between 40° to 90° inclusive.

"Radial segment ($R_s$)" as used in this invention is defined as a circumferential distance along the radial angle of curvature.

"Radius (R)" as used in this invention is defined as the straight line distance from a central point of a circular geometric figure to any point on its circumferential edge.

"Profile Radius ($R_p$)" as used in this invention is defined as an internal end radius of the initial generally straight profile upon which a second overmolded profile is molded thereupon.

Figure 2:
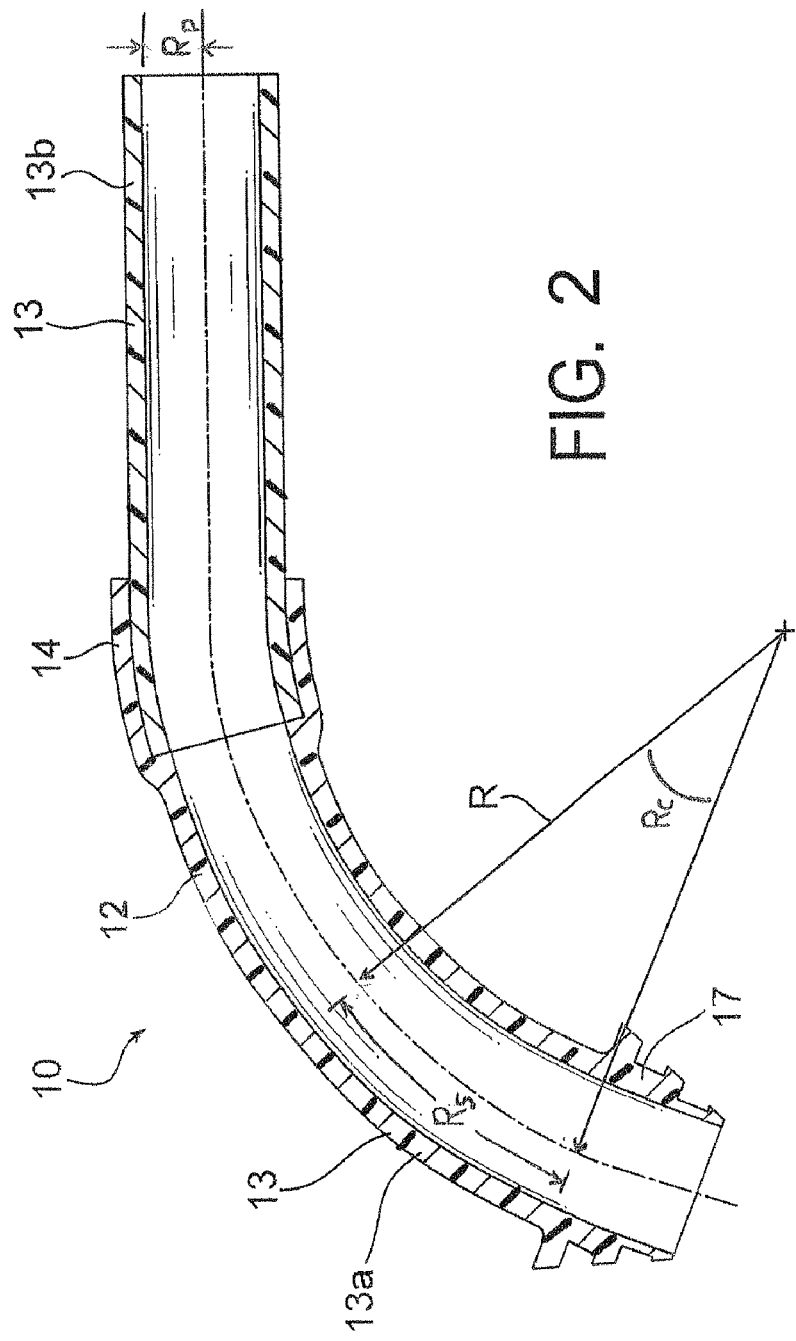
FIG. 2 is a cross sectional view of the curved rigid and/or semi-rigid overmold end section of FIG. 1, further illustrating the locations of a representative Radial angle of curvature ($R_c$), Radial segment ($R_s$), Radius (R), and Profile Radius ($R_p$).

Conduit 10 as illustrated in FIGS. 1 and 2 comprises a rigid and/or semi-rigid overmolded component in combination with an essentially linear profile and is overmolded in an injection overmolding process. The polymeric materials are at least partially chemically compatible as defined above so that the polymeric components bond together in an assembly process thereby forming a unitary article (i.e., not capable of being disassembled without destroying the connection between the polymeric components). The overall structure, i.e. conduit 10, takes on a generally curvilinear configuration, which may refer to any configuration of conduit that includes a profile having a radial angle of curvature as defined herein. Any quantity of profile shapes and any sequence of arranging the profile sections may be chosen without departing from the intended scope of coverage of the embodiments of the subject invention.

With reference to FIG. 2, in one embodiment, overmold 13a is molded from rigid or semi-rigid polymeric material, which are overmolded through an injection overmolding process onto a second generally straight profile 13b made from either rigid, semi-rigid or flexible polymeric materials, which are typically extruded. However, conduit 10 is not limited to this particular arrangement and may be constructed from profiles having any shape known to those of skill in the art. The overmold 13a and profile 13b of which the particular configuration as illustrated in FIG. 2 is only exemplary in nature. Components 13 may be joined together in a molding process at a first juncture 14. Any contour, length and/or diameter of a profile may be utilized to form conduit 10 without departing from the intended scope of coverage of the embodiments of the subject invention. Distal end 17 of assembly 12 may be formed for fastening to a mating conduit component, not shown, for use within the system, as mentioned above. It is to be understood that any configuration of conduit end 17 may be incorporated as is suitable for connecting to the overall system and for conveying fluids.

Still referring to FIG. 2, curved portion of conduit 10 is made from rigid or semi-rigid polymeric materials and is formed in an overmolding process. Specifically, the curved portion of conduit 10 is formed by an injection overmolding process. Injection overmolding generally refers to a process where at least one hollow article, which in the present embodiment is a generally straight extruded profile 13b, is inserted into a mold and a polymeric material is overmolded onto the profile 13b. Profile 13b is, in general, an extruded profile (e.g., tube), and overmold 13a is an overmolded profile that is molded about the cavity 32. The extruded tube may be comprised of any extrudable polymer, preferably polyethylene (PE) for plumbing applications, with optional crosslinking, preferably by radiation crosslinking. The overmolded component can be a rigid and/or semi-rigid polymer according to the definition herein. The composition of the inserted profile and the overmolded profile may be the same or different. The durometer of the inserted profile can be almost infinite, whereas the durometer of the overmolded polymer should fall within the identified ranges. The rigidity of the inserted profile and overmolded polymer may be the same or different, this difference caused by the inclusion of different additives and/or quantity of additives, or due to the composition of the polymers.

Figure 3:
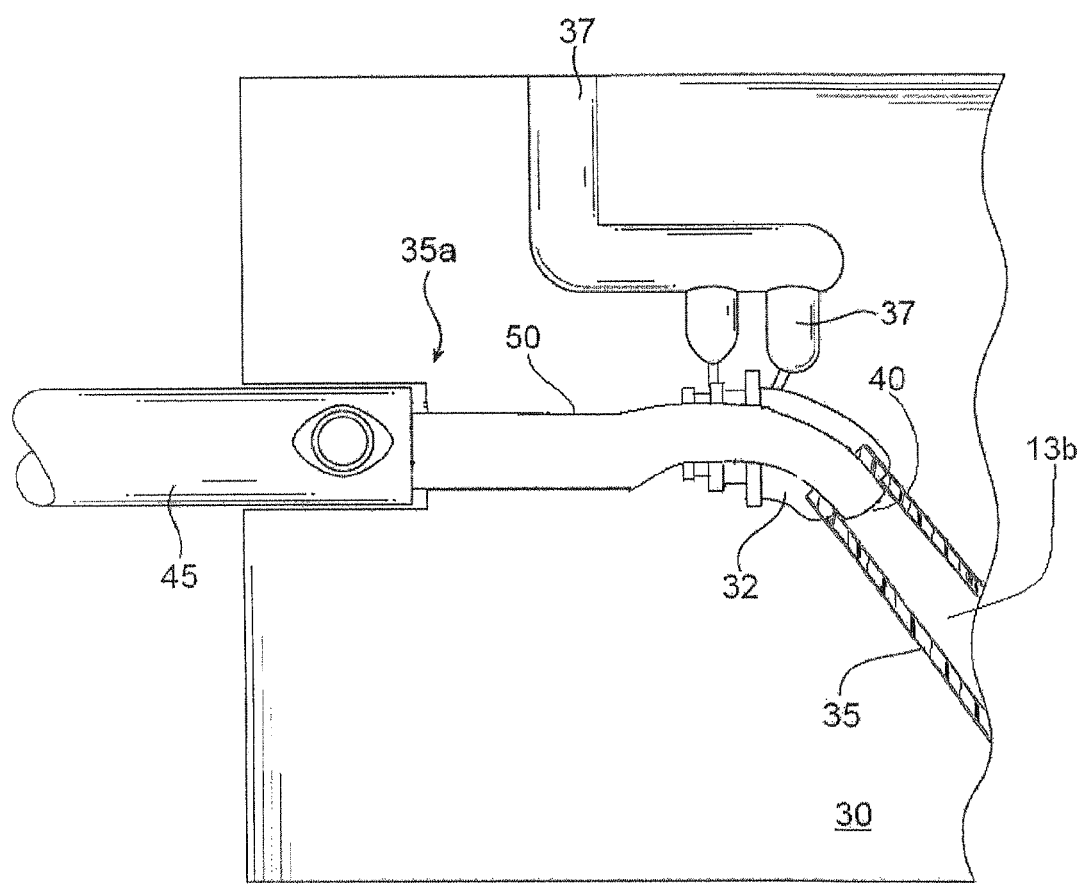
FIG. 3 is a side view of a split mold illustrating a core pin positioned within the split mold and at least partially extending into a first profile with a cavity void extending about an external periphery of the inserted profile, at least an end portion of which is essentially straight.

An exemplary split mold 30 of the present embodiment is illustrated in FIG. 3. It will be understood by those skilled in the art that the mold may take on any number of configurations. For purposes of illustration, only one split mold internal configuration is illustrated. Mold 30 has at least one end 35 and comprises a mandrel 45, curved pin 50 and a cavity 32, where the cavity corresponds to the desired shape of the overmold. A series of runners 37 allows for injection of molten polymeric material into cavity 32 of split mold 30 to form the overmold. As illustrated in FIG. 3, the profile 13b is at least partially inserted into a mold 30 and mold cavity 32 at the recessed portion 35 of the mold.

Accordingly, an extruded profile is placed into end 35 of mold 30. With reference to FIG. 3, in one particular embodiment, mold 30 is constructed having a cavity 32 sized to receive at least part of the generally straight profile 13b. It will be readily seen that the contour of cavity 32 defines the shape of the overmold. Cavity 32 in the presently preferred embodiment has a radial angle of curvature ($R_c$) as defined herein. Although, the particular configuration of cavity 32, or cavities, should not be construed as limiting, as long as molten material is able to completely fill and pack cavity 32. Mold 30 has a recessed portion 35 positioned adjacent to cavity 32 specifically for receiving and/or aligning the generally straight profile 13b. In this manner, the generally straight profile 13b resides within the recessed portion 35 and extends, at least partially, into cavity 32 for overmolding. Persons of ordinary skill in the art will recognize that mold 30 also includes a series of runners 37 in fluid communication with an injection unit through a sprue/sprue bushing, not shown.

As illustrated in FIG. 3, curved core pin 50 is situated within mold cavity 32 and is held in an axial position by mandrel 45. In the overmolding process, rigid or semi-rigid polymeric material in a molten state is put into the mold against the end walls and also around the exterior surface of cavity 32. In operation, mold 30 is thereafter closed and clamped together under substantial force where molten material is subsequently injected into mold cavity 32 and allowed to cool thus forming the assembly 12. The temperature of the rigid or semi-rigid molten polymeric material is sufficiently hot to cause the polymeric composition of profile 13b to become melt processable and at least partially chemically bond with at least an inner layer of overmold 13a. It follows that the molten material and the outer layer of the profile are at least partially chemically compatible thereby bonding to form a unitary article. This eliminates the need for an adhesive or other means of fastening various sections of tubing together and ensures a continuously sealed connection throughout conduit 10, thus forming a leak-proof seal without the addition of adhesives.

In the present embodiment, curved core pin 50 has at least a portion having a radial angle of curvature as defined above. During the overmolding process, core pin 50 is inserted into cavity 32 and at least partially inserted into extruded profile at the end 40 of the mold 30. Vertical movement of core pin 50 in combination with curved pin 32 inserts and removes the mandrel/core pin within cavity 32 and mold 30. As illustrated in FIG. 3, core pin 50 is insertable into cavity 32. The curved portion of core pin 50 has a radial angle of curvature ($R_c$), thereby defining the radial segment of curvature of the overmolded article.

When the overmold cools to form a solidified, self supporting structure within an injection mold, it contracts into tight engagement with core pin 50. After the overmold article is molded and cooled, the overmold article is removed from the mold. The mold is opened and the overmolded article is removed with the curved core pin remaining within the overmolded portion 13a of connector 10. The core pin is removed by the application of a longitudinal force along the $R_c$ arc thereby pulling the overmold part off the mandreal and curved core pin. In prior art applications involving co-axial overmolds and extruded profiles, the core pin is removed from the overmolded part by simply moving the core pin out of axial alignment with the cavity.

In the present invention, the curved core pin 50 is removed from the overmolded part along the radial angle of curvature. The result is an overmold having a hollow interior corresponding to the radial angle of curvature of core pin 50. The configuration of core pin 50 illustrated and described permits a simple method of removing, ejecting or stripping the overmolded part from the core pin where a rigid polymeric material is used to make the overmold. As illustrated in FIG. 3, core pin 50 is inserted along a vertical axis which is normal to the horizontal plane of the split mold 30. The overmolded part is removed from the mold with the core pin remaining on the interior of the overmolded part. The overmolded part is removed from the core pin by asserting force on the overmolded part along the radial angle of curvature.

An overmolding cycle includes the following steps. Mold cavity 32, mandrel 45 and core pin 50 are moved axially into engagement within mold 30. Next, molten polymeric material is fed from a feeder means such as a molten plastic supply station (not shown) into cavity by a series of runners 37 or other conventional feeder means known to those of skill in the art. When sufficient rigid or semi-rigid molten plastic is injected into the cavity, the feeder means is disengaged. Sufficient time is allowed for the molten plastic to solidify so that a self supporting overmolded part can be extracted from the mold upon opening. After the cooling cycle is completed, mandrel 45 and core pin 50 are moved out of engagement with the mold 30. When the mandrel and core pin are removed sufficiently, core pin 50 can be removed from cavity 32 in order to strip the overmolded part for removal and collection from mold 30.

In one particular embodiment as illustrated in FIGS. 1 and 2, overmold 13a has a characteristic radial angle of curvature ($R_c$), as determined by the shape of the cavity 32 and pin 50, which both have a radial angle of curvature ($R_c$). In particular, it is that portion of the overmold as formed by core pin 50 that has a radial angle of curvature ($R_c$). By incorporating a radial angle segment, the molded article may be removed from the mold, and core pin may be retracted from overmolded part without detrimentally deforming the overmold. In another embodiment, the radial angle of curvature may vary from an initial radial angle to a radial angle that is somewhat larger or smaller, the magnitude of which may be a function of the material elasticity as defined above. It is noted that overmold 13a is independent of its arc length. As such, the overmold 13a may have any arc length chosen with sound engineering judgment.

The overmold 13a has an inner diameter and an outer diameter. The outer diameter has a leading edge. The outer diameter of the overmold 13a is rounded or reduced along the leading edge of the outer diameter. The reduction in diameter allows the overmold to be inserted into the plumbing fitting without de-burring the leading edge.

The overmold is comprised of rigid or semi-rigid polymeric materials. In one embodiment, the polymeric materials may be crosslinked chemically or by irradiation. Crosslinking may be implemented prior to, during or after the molding process. In particular, crosslinking of the straight profile may be accomplished prior to, during or after the molding process. Additionally, crosslinking of the overmolded profile may be accomplished during or after molding. PE (Polyethylene), in any of its various densities, e.g. LDPE, MDPE and HDPE, PE is one such polymeric material that can be used to fabricate the conduit 10. Another material that can be used is PVC (Polyvinyl Chloride). The PVC may be chlorinated, also termed CPVC, which is resistant to many types of acids, bases, salts, hydrocarbons, and alcohols, just to name a few. Other types of material may be used to form the profile or overmold. Among these include ABS (Acrylonitrile Butadiene Styrene) or PP (Polypropylene). The above listed materials are not to be construed as limiting, rather any type of polymeric material may be used to construct conduit 10 as is appropriate for use with the embodiments of the present invention.

As described herein, a process is described for balancing various parameters which are pertinent when overmolding a curvilinear rigid or semi-rigid polymer having a first profile, and a radial angle of curvature ($R_c$), a radial angle of curvature radius (R), and a circumferential radial segment ($R_s$), onto a second pre-formed profile, said second pre-formed profile having an internal radius ($R_p$) as illustrated in FIG. 2. In this procedure, the following steps are employed: (a) assembling a split mold having at least one channel and a mold cavity, the channel in communication with said cavity; (b) inserting a second pre-formed profile into said at least one channel and at least partially into the cavity; (c) inserting a curved core pin into the mold cavity and at least partially into the second pre-formed profile; (d) injecting a polymeric material into the split mold and the mold cavity thereby overmolding onto at least a portion of the pre-formed profile to form an overmolded profile, the overmolded profile having a durometer ranging from approximately 35 Shore D to 95 Shore D inclusive; (e) removing the core pin and the two profiles from the split mold; and (f) extracting the core pin from the first profile along said radial angle of curvature of said core pin and said first profile by the application of force along the radial angle of curvature. During the above operations, the radial angle of curvature ($R_c$) of said core pin and said mold cavity are essentially the same and said radial angle of curvature ranges between approximately 20° to 360° inclusive; said radial angle of curvature further being in the shape of a helix, said helix having a pitch equal to the width of one complete helix turn as measured along the helix axis and equal to at least 2*R; said pitch having a draft angle (an increasing I.D.) which incrementally increases along said overmolded segment; said radial segment ($R_s$) is defined by the formula $$R_s = \frac{R_c * 2 * \pi * R}{360°}$$

wherein R is greater than or equal to twice $R_p$; and further wherein as said durometer of said overmolded profile increases from 35 Shore D to 95 Shore D, said radial segment ($R_s$) decreases.

As is known in the art, precise formulas for calculating proper draft angles do not exist, but can be determined with routine experimentation. It is typically understood that a draft angle of 1° per side provides easy ejection of most smooth surfaces. Depth of draw, mold surface roughness, part complexity and the mold ejection system are some of the factors that influence the selection of draft angles. Also, material properties such as strength, rigidity, lubricity and shrinkage can also affect the amount of draft required for an application. Therefore, this angle is dependent upon the length of the arc and the overmolded material. The more rigid the overmolded material and shorter the arc length, the higher the draft angle. Therefore, the draft angle is inversely proportional to the rigidity of the material and arc length. As a rough approximation, a draft angle of 1° is 0.0175"/inch of taper, although it is recognized that this value can increase or decrease depending on other factors known by those of ordinary skill in the art.

As described herein, a process is described for balancing various parameters which are pertinent when overmolding a curvilinear rigid or semi-rigid polymer having a first profile, and a radial angle of curvature ($R_c$), a radial angle of curvature radius (R), and a circumferential radial segment ($R_s$), onto a second pre-formed profile, said second pre-formed profile having an internal radius ($R_p$) as illustrated in FIG. 2. In this procedure, the following steps are employed: (a) assembling a split mold having at least one channel and a mold cavity, the channel in communication with said cavity; (b) inserting a second pre-formed profile into said at least one channel and at least partially into the cavity; (c) inserting a curved core pin into the mold cavity and at least partially into the second pre-formed profile; (d) injecting a polymeric material into the split mold and the mold cavity thereby overmolding onto at least a portion of the pre-formed profile to form an overmolded profile, the overmolded profile having a durometer ranging from approximately 35 Shore D to 95 Shore D inclusive; (e) removing the core pin and the two profiles from the split mold; and (f) extracting the core pin from the first profile along said radial angle of curvature of said core pin and said first profile by the application of force along the radial angle of curvature. During the above operations, the radial angle of curvature ($R_c$) of said core pin and the mold cavity are essentially the same and this angle of curvature ranges between approximately 20° to 150° inclusive. The radial segment ($R_s$) is defined by the formula $$R_s = \frac{R_c * 2 * \pi * R}{360°}$$

wherein R is greater than or equal to twice $R_p$ and further wherein as said durometer of said overmolded profile increases from 35 Shore D to 95 Shore D, said radial segment ($R_s$) decreases.

In another embodiment, the radial angle of curvature ($R_c$) is between approximately 30° to 120° inclusive and the durometer of said overmolded profile ranges from approximately 40 Shore D to 65 Shore D inclusive and R is greater than or equal to four times $R_p$. In still another embodiment of the invention, the radial angle of curvature ($R_c$) is between approximately 40° to 90° inclusive and the durometer of said overmolded profile ranges from approximately 45 Shore D to 60 Shore D inclusive and R is greater than or equal to 10 times $R_p$.

While the discussion above focuses on an overmold that has a round or tubular shape, the invention is equally applicable to any cross-section profile. For example, the cross section may be star-shaped, rectangular, square, triangular or any other geometric shape that is desired for the intended application.

The best mode for carrying out the invention has been described for the purposes of illustrating the best mode known to the applicant at the time. The examples are illustrative only and not meant to limit the invention, as measured by the scope and spirit of the claims. The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A process for overmolding a curvilinear rigid or semi-rigid polymer having a first profile, a radial angle of curvature ($R_c$), a radial angle of curvature radius (R), and a circumferential radial segment ($R_s$) onto a second profile, said second profile having an internal radius ($R_p$) comprising the steps of:
assembling a split mold having at least one channel and a mold cavity, said channel in communication with said cavity;
inserting said second profile into said at least one channel and at least partially into the cavity;
inserting a curved core pin into the mold cavity and at least partially into said second profile;
injecting a polymeric material into the split mold and said mold cavity thereby overmolding onto at least a portion of the second profile to form said overmolded first profile having a durometer ranging from approximately 35 Shore D to 95 Shore D inclusive;
removing said core pin and the two profiles from the split mold;
extracting said core pin from the first profile along said radial angle of curvature of said core pin and said first profile; wherein
said radial angle of curvature ($R_c$) of said core pin and said mold cavity are essentially the same and said radial angle of curvature ranges between approximately 20° to 150° inclusive;
said radial segment ($R_s$) is defined by the formula $$R_s = \frac{R_c * 2 * \pi * R}{360°}$$

wherein R is greater than or equal to twice $R_p$; and further wherein
as said durometer of said overmolded profile increases from 35 Shore D to 95 Shore D, said radial segment ($R_s$) decreases.

2. The process of claim 1, wherein
said radial angle of curvature ($R_c$) is between approximately 30° to 120° inclusive;
said durometer of said overmolded profile ranges from approximately 40 Shore D to 65 Shore D inclusive; and
wherein R is greater than or equal to four times $R_p$.

3. The process of claim 2, wherein
said radial angle of curvature ($R_c$) is between approximately 40° to 90° inclusive;
said durometer of said overmolded profile ranges from approximately 45 Shore D to 60 Shore D inclusive; and
wherein R is greater than or equal to 10 times $R_p$.

4. The process of claim 1, wherein
said second profile is extruded.

5. A process for overmolding a curvilinear rigid or semi-rigid polymer having a first profile, a radial angle of curvature ($R_c$), a radial angle of curvature radius (R), and a circumferential radial segment ($R_s$) onto a second profile, said second profile having an internal radius ($R_p$) comprising the steps of:
assembling a split mold having at least one channel and a mold cavity, said channel in communication with said cavity;
inserting said second profile into said at least one channel and at least partially into the cavity;
inserting a curved core pin into the mold cavity and at least partially into said second profile;
injecting a polymeric material into the split mold and said mold cavity thereby overmolding onto at least a portion of the second profile to form said overmolded first profile having a durometer ranging from approximately 35 Shore D to 95 Shore D inclusive;
removing said core pin and the two profiles from the split mold;
extracting said core pin from the first profile along said radial angle of curvature of said core pin and said first profile; wherein
said radial angle of curvature ($R_c$) of said core pin and said mold cavity are essentially the same and said radial angle of curvature ranges between approximately 20° to 360° inclusive;
said radial angle of curvature ($R_c$) further being in the shape of a helix, said helix having a pitch equal to the width of one complete helix turn as measured along the helix axis and equal to at least 2*R; said pitch having a draft angle of increasing I.D. which incrementally increases along said first profile;
said radial segment ($R_s$) is defined by the formula $$R_s = \frac{R_c * 2 * \pi * R}{360°}$$

wherein R is greater than or equal to twice $R_p$; and further wherein
as said durometer of said overmolded profile increases from 35 Shore D to 95 Shore D, said radial segment ($R_s$) decreases.

6. The process of claim 5, wherein
said radial angle of curvature ($R_c$) is between approximately 30° to 120° inclusive;
said durometer of said overmolded profile ranges from approximately 40 Shore D to 65 Shore D inclusive; and
wherein R is greater than or equal to four times $R_p$.

7. The process of claim 6, wherein
said radial angle of curvature ($R_c$) is between approximately 40° to 90° inclusive;
said durometer of said overmolded profile ranges from approximately 45 Shore D to 60 Shore D inclusive; and
wherein R is greater than or equal to 10 times $R_p$.

8. The process of claim 7, wherein
said second profile is extruded.

9. The process of claim 7 wherein
said draft angle is inversely proportional to the durometer of said overmolded profile and radial angle of curvature.

* * * * *